United States Patent [19]

Tukada et al.

[11] Patent Number: 4,916,297
[45] Date of Patent: Apr. 10, 1990

[54] CODE READER

[75] Inventors: Toshirou Tukada; Koichi Kameyama, both of Tokyo, Japan

[73] Assignee: Tokyo Kogaku Kikai Kabushiki Kaisha, Tokyo, Japan

[21] Appl. No.: 378,485

[22] Filed: Jul. 12, 1989

Related U.S. Application Data

[63] Continuation of Ser. No. 121,644, Nov. 16, 1987, abandoned.

[30] Foreign Application Priority Data

Nov. 17, 1986 [JP]   Japan ................................ 61-273187

[51] Int. Cl.⁴ .............................................. G06F 7/10
[52] U.S. Cl. .................................... 235/462; 235/463; 235/472
[58] Field of Search ........................ 235/462, 463, 472

[56]   References Cited
U.S. PATENT DOCUMENTS

| | | | |
|---|---|---|---|
| 3,920,957 | 11/1975 | Sims | 235/462 |
| 4,210,802 | 7/1980 | Sakai | 235/462 |
| 4,409,469 | 10/1983 | Yasuda | 235/462 |
| 4,742,220 | 5/1988 | Beyor | 235/462 |

FOREIGN PATENT DOCUMENTS 54-4208  3/1979  Japan.
5434618 10/1988 Japan.

OTHER PUBLICATIONS

*Bar Code Symology*, David C. Allais Feb. 16, 1982, Intermec®, p. 7.

Primary Examiner—Harold I. Pitts
Attorney, Agent, or Firm—Finnegan, Henderson, Farabow, Garrett & Dunner

[57]   ABSTRACT

A code reader comprising a scanner portion including an illuminating light source for illuminating a code in which all data are separated into at least two parts. A first partial code pattern and a second partial code pattern and a plurality of discriminating elements are arranged as such that the first and the second partial code patterns can be distinguished. A light receiving portion for receiving a reflection light reflected by the code, and a binary processing portion for binating an output signal of the light receiving portion; and a decode portion for decoding the binary signal for each partial code data based on an output of the binary processing portion.

9 Claims, 10 Drawing Sheets

CODE READER

This application is a continuation of application Ser. No. 121,644, filed Nov. 16, 1987 now abandoned.

BACKGROUND OF THE INVENTION

1. Field of the Invention

This invention relates to a code reader capable of reading data which the code means rapidly and correctly, even when a part of a code is, for example, defective or dirty.

2. Description of the Related Art

Heretofore, there is known a code reader for illuminating the code and reading the meaning of the code as data therefrom, the code in which all data are separated into at least two patterns such as a first partial code pattern and a second partial code pattern and a plurality of discriminating elements are arranged as such that the first and the second partial code patterns can be distinguished.

Figure 11:
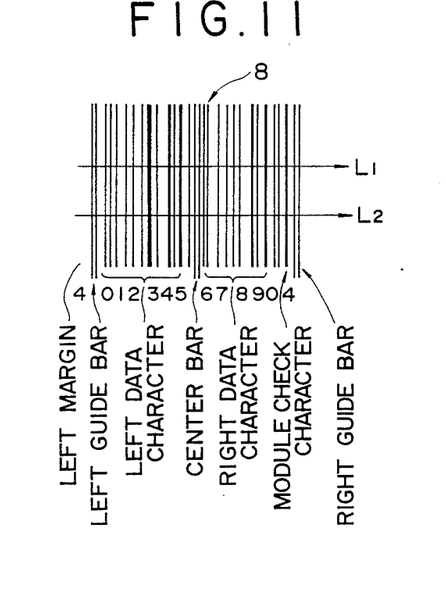
FIGS. 11 through 13 are plan views of a bar code symbol for explaining the inconveniences which the conventional code reader has.

For example, in a bar code symbol, as shown in FIG. 11, a left character bar as a code pattern is disposed between a left guard bar as an end bar and a center bar as a discriminating element, and a right data character bar as a code pattern and a modular check character are disposed between the center bar and a right guide bar as an end bar. Data is given according to the width and space of the bar of the bar code. The code reader reads the width and space of the bar by illuminating the bar code symbol and obtains data.

However, for some instance such as when a bar code symbol becomes dirty or defective or when a harmful reflection light enters, the conventional code reader is unable to read the code. In order to read the code, the reading procedure must be taken repeatedly. Thus, there is present such a problem as that the reading work is inconvenient.

Figure 12:
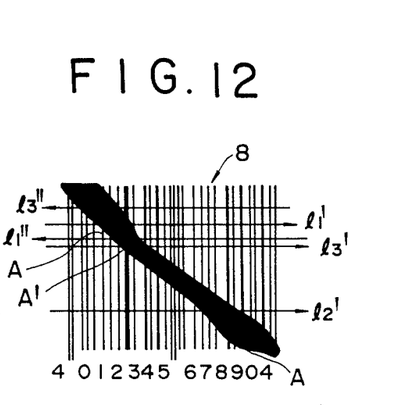
Figure 13:
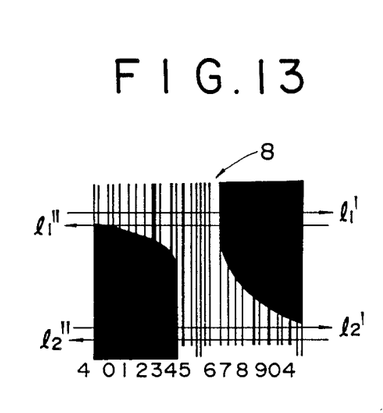

To solve this problem, a code reader is proposed as disclosed in Japanese patent publication No. 54-34618 and Japanese patent publication No. 54-4208, in which illumination scanning places $L_1$ and $L_2$ are intendibly changed on a bar code in order to read a code meaning data. However, the code reader disclosed in Japanese patent publication Nos. 54-34618 and 54-4208 are constituted as such that the code meaning data is unable to be read as long as all data are not regularly read. Therefore, in order to read the code meaning data, the data must be read by illuminating only a place of the code where the code does not become dirty. For example, when a bar code symbol 8 gets dirty or defective as shown in FIGS. 12 and 13, a scanning line crosses a dirty part at any scanning place as shown in scannings $l_1$ and $l_2$. Therefore, the bar code meaning data is unable to read at all.

Moreover, in the case of an enlarged bar code symbol, only a part of the bar code symbol can be read as data in such a near distance shorter than the arrangement width of the bar code. Therefore, the all data cannot be read, even if the reading operation is repeated many times.

SUMMARY OF THE INVENTION

It is therefore a general object of the present invention to provide a code reader, in which even when a part of a code cannot be correctly read as data, all data can be read correctly from several scanning results.

A code reader according to the present invention is developed by paying an attention to the fact that, in a code such as a bar code, all data are separated into at least two such as a first partial code pattern and a second partial code pattern and discriminating elements are arranged as such that the first and the second code patterns can be distinguished.

The first invention comprises a scanner portion including an illuminating light source for illuminating a code in which all data are separated into at least two parts such as a first partial code pattern and a second partial code pattern and a plurality of discriminating elements are arranged as such that the first and the second partial code patterns can be distinguished, a light receiving portion for receiving a reflection light reflected by the code, and a binary processing portion for binating an output signal of the light receiving portion; and a decode portion for decoding the binary signal for each partial code data based on an output of the binary processing portion; the all code data being read by illuminating the code by holding at least one of the scanner portion having the illuminating light source with hand and an indicating means in which the code is indicated; the decode portion comprising judgement means for judging whether the first and second code patterns are regularly read based on the discriminating elements, memory means for memorizing the first and second partial code data regularly read, and a code data composing portion for composing the partial code data when the all partial code data are memorized in the memory means.

The second invention comprises a scanner portion including an illuminating light source for illuminating a code in which a plurality of discriminating elements are arranged, a scanning optical system for guiding an illumination light emitted by the illuminating light source to the code and scanning the code, a light receiving portion for receiving a reflection light reflected by the code, and a binary processing portion for binating an output signal of the light receiving portion; and a decode portion for decoding the binary signal for each partial code data based on an output of the binary processing portion; the all code data being read by scanning the code; the decode portion comprising judgement means for judging whether the first and second code patterns are regularly read based on the discriminating elements, memory means for memorizing the first and second partial code data regularly read, and a code data composing portion for composing the partial code data when the all partial code data is memorized in the memory means.

The third invention comprises a scanner portion including a read portion for reading data from a code in which a plurality of discriminating elements are arranged; and a decode portion for decoding the read signal read from the read portion for each partial code data; the decode portion comprising judgement means for judging whether the first and second code patterns are regularly read based on the discriminating elements, memory means for memorizing the first and second partial code data regularly read, and a code data composing portion for composing the partial code data when the all partial code data are memorized in the memory means.

In the case of the first invention, the indicating member where such a code as a bar code symbol is indicated and a scanner portion of a code reader is held by hand and a scanning is performed. When the partial code pattern is read as a partial code data with the discriminating elements therebetween, the judgement means judges whether the partial code data is regular or not. And, in the case a certain partial code data or first partial code data is judged as regular, the partial data regularly read is memorized in the memory means. In the case the scanning is performed by holding it by hand, the scanning place is naturally changed due to shaking of the hand, and the remaining partial code pattern or second partial code pattern is read as a partial code data. When the second partial code data is regularly read, the partial code data is memorized in the memory means. And, when both the first and the second partial code data are regularly read, the all code data are composed.

In the case of the second invention, when a certain partial code pattern or first partial code pattern is read as a partial code data by scanning the code, the first code data is judged whether it is regular or not. And, in the case the first partial code data is judged as regular, the first partial code data regularly read, is memorized in the memory means. When the second partial code data is not regularly read, the scanning place is automatically changed. And, when both the first and the second partial code data are regularly read, the partial code data are composed.

In the case of the third invention, the operation of the decode portion is almost the same to that of the aforementioned first and second inventions.

BRIEF DESCRIPTION OF THE DRAWINGS

FIGS. 1 through 4B illustrate one embodiment of a code reader of a first invention according to the present application, wherein;

FIGS. 5 and 6 illustrate one embodiment of a code reader of a second invention according to the present invention, wherein;

FIGS. 7 through 10B illustrate another embodiment of a code reader of the first invention according to the present application, wherein;

DETAILED DESCRIPTION OF THE PREFERRED EMBODIMENT

A code reader according to the present invention will be described hereinafter with reference to the accompanying drawings.

Figure 1:
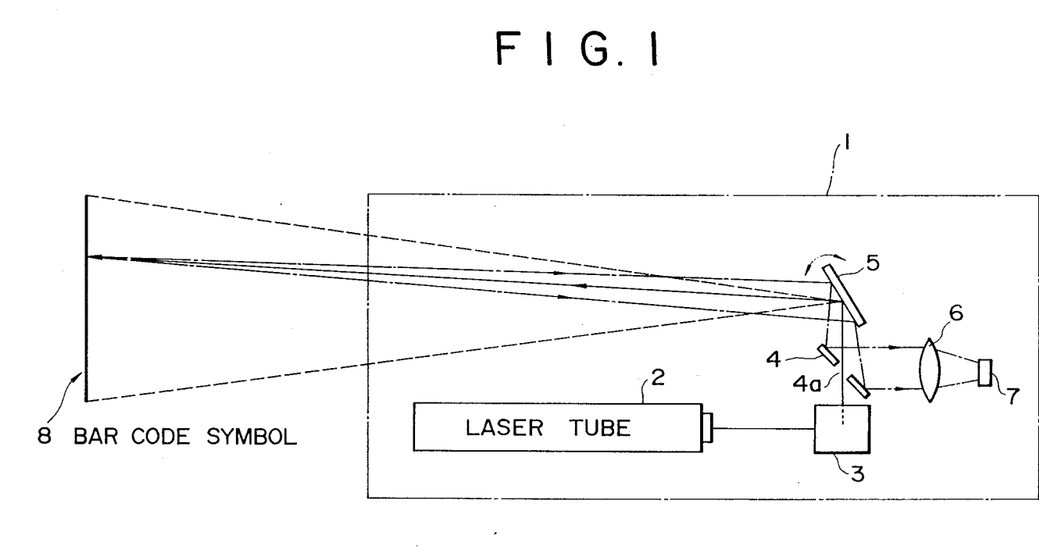
FIG. 1 is a plan view of an optical system of a scanner portion thereof.
Figure 2:
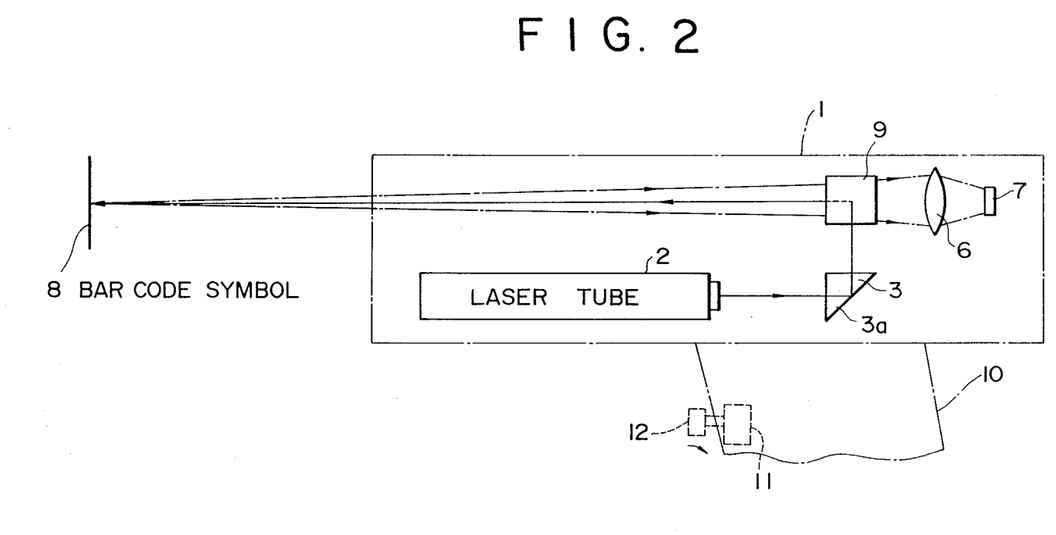
FIG. 2 is a side view of the optical system of FIG. 1.
Figure 3:
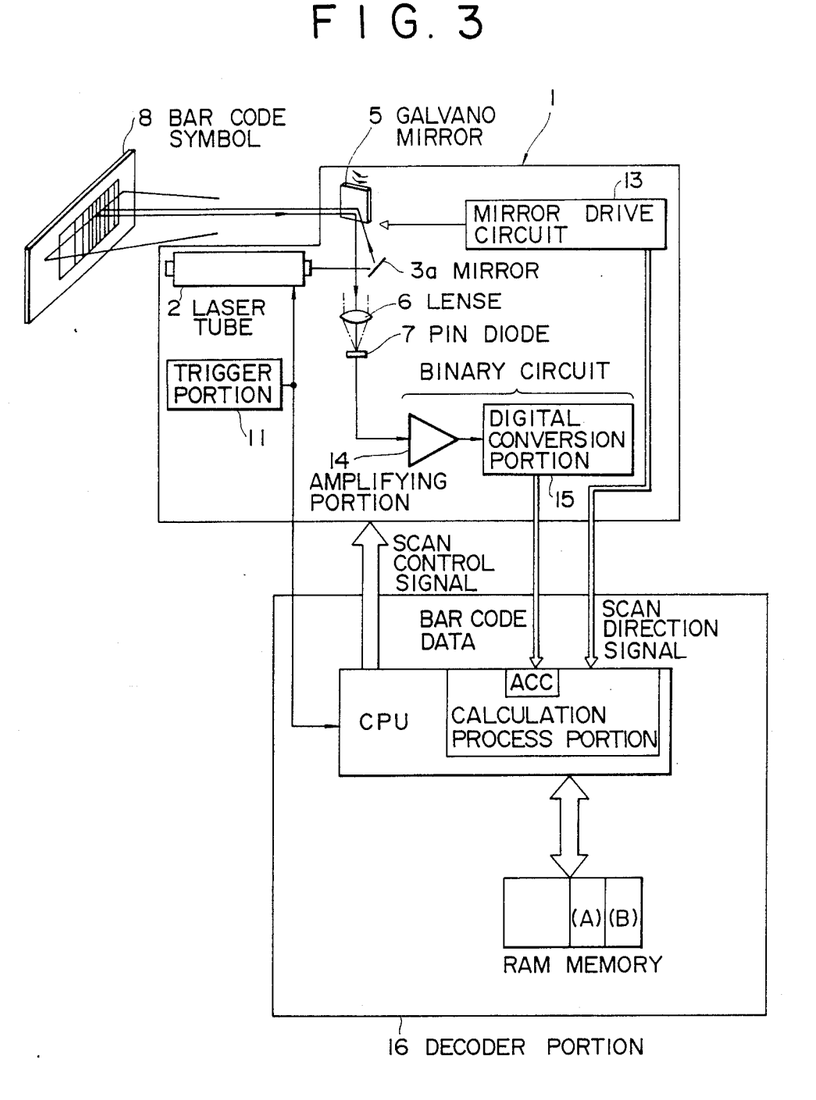
FIG. 3 is a circuit diagram of an optical code reader thereof.

FIGS. 1 through 4 are illustrations showing one embodiment of a hand hold type code reader according to a first invention of the present application. In FIGS. 1 and 2, reference numeral 1 denotes a scanner portion. The scanner portion 1, as shown in FIG. 1, is provided with a laser tube 2 as an illumination light source, a rectangular prism 3, a perforated mirror 4, a galvano mirror 5, an imaging lens 6, and a light receiving element 7 as a light receiving portion. The scanner portion 1, as shown in FIG. 2, is further provided with a rectangular prism 9, and a grip 10. The grip 10 is provided with a trigger portion 11 and a trigger switch 12. The scanner portion 1, as shown in FIG. 3, is provided with a binary circuit comprising a mirror drive circuit 13, an analog amplifying portion 14, and a digital amplifying portion 15.

A laser beam emitted from the laser tube 2 is reflected by a mirror surface $3a$ of the rectangular prism 3 and the rectangular prism 9, guided to the galvano mirror 5 after passing through a hole $4a$ of the perforated mirror 4, and then reflected by the galvano mirror 5 towards the bar code symbol 8. The galvano mirror 6 is periodically oscillated by a motor not shown. Due to the oscillation of the galvano mirror 5, scannings $L_1$ and $L_2$ are performed in the direction crossing the bar of the bar code symbol 8 as shown in FIG. 11.

A reflection light reflected by the bar code symbol 8 is reflected by the galvano mirror 6, then reflected by the perforated mirror 4 and guided to the lens 6, and imaged on the light receiving element 7 such as a PIN photo diode. The strength of the reflection light is changed corresponding to the width of the bar and the space thereof. Accordingly, the output of the light receiving element 7 is changed according to the change of the strength of the reflection light. The output is amplified by the analog amplifying portion 14 as a binary circuit, digital converted by a digital conversion portion 15, and input into the decoder portion 16. The decoder portion 16 includes at least a CPU and a RAM memory.

The CPU is actuated when the trigger portion 11 is turned on and outputs a scanner control signal to the scanner portion 1 so that the scanner portion 1 performs a predetermined scanner, the details of which will be described afterwards together with the description of the operation thereof.

When the trigger portion 11 is turned on by the trigger switch 12, a laser beam is radiated and the CPU is actuated. Upon actuation of the CPU, a scanner control signal is output to the scanner portion 1, the mirror drive circuit 13 is driven, the galvano mirror 5 is oscillated, and the scanning of the bar code symbol 8 is started. A reflection light from the bar code symbol 8 is received by the light receiving element 7 by means of the lens 6. By this, a scan detection is performed (Step $S_1$) in the manner as shown in a flow chart of FIG. 4. An output of the light received by the light receiving element 7 is changed corresponding to the arrangement of the bar, the width, space of the bar, etc., and the output of the received light is binated by the binary circuit in succession (Step $S_2$) and is once memorized in the RAM memory as a data through the ACC (Step $S_3$). This procedure is repeated until a first scanning $l_1$ is over (Step $S_4$).

Figures 4, 4B:
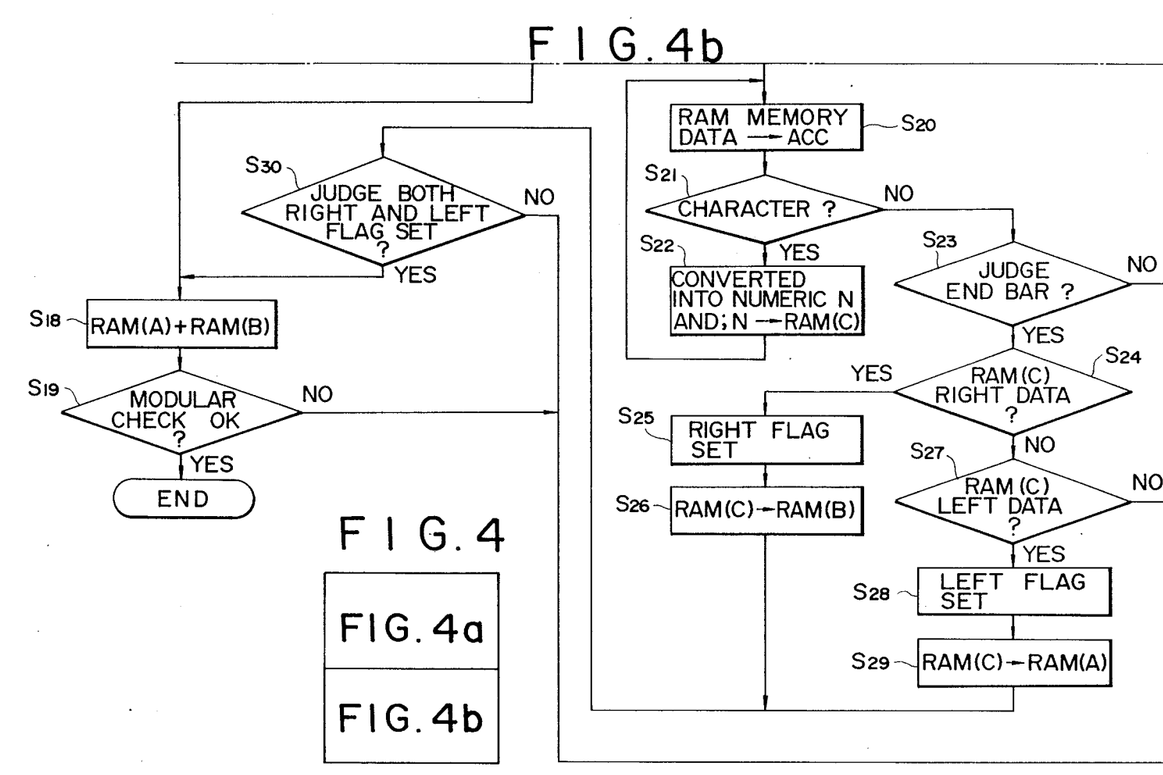
FIG. 4 is a flow chart for explaining the operation of the code reader.
Figure 4A:
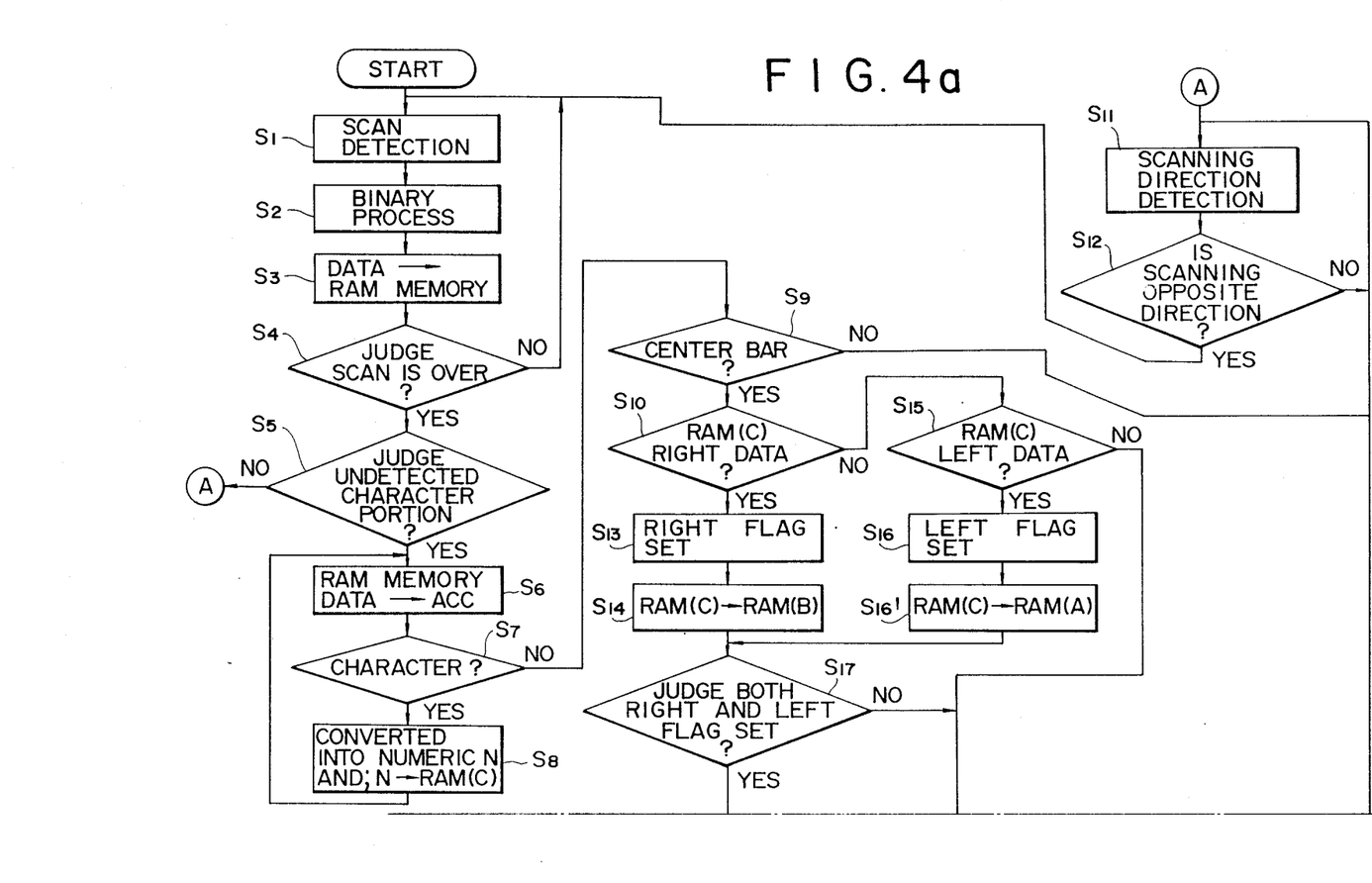

Next, the CPU judges whether it is an undetected character portion or not (Step $S_5$). It is judged whether the character portion is an undetected one or not from the scanning direction and the detected data character. In the case of a first scanning $L_1$, since the character portions of both the right and the left data are undetected, it goes to Step $S_8$.

That is, in the case the bar code symbol 8 is not dirty or defective as shown in FIG. 11, in the case the bar code symbol 8 is dirty as shown in FIG. 12, or in the case the bar code symbol 8 is dirty as shown in FIG. 13, the procedure after Step $S_5$ is carried out in the case of a first scanning. The flow after Step $S_5$ will be described here with reference to FIGS. 11 through 13.

(1) In the case the bar code symbol is not dirty:

In Step $S_5$, data memorized in the RAM memory is called to the ACC in succession and judged whether it is a data character or not (Step $S_7$). In the case the data called in succession is the data character, it goes to Step $S_8$, wherein the data character is converted into a numeric N and the numeric data is transmitted to the RAM(C) in succession and memorized. The data character is repeatedly converted into a numeric N until the data called in succession becomes non-data character. In the bar code symbol 8, since the left data character is followed by the center bar, when it is judged as a non-data character in Step $S_7$, it goes to Step $S_9$. In Step $S_9$, it is judged whether the data called in succession is a center bar or not.

If the center bar is detected (YES) here, it goes to Step $S_{10}$. When the center bar is not detected because of some reasons such as an entrance of a harmful light in spite of the fact that the bar code symbol 8 is not dirty, it goes to Step $S_{11}$. In Step $S_{11}$, a scanning direction is detected. Then, in Step $S_{12}$, it is judged whether it is an opposite scanning direction or not with respect to the scanning direction of the data character just detected now. A loop of Step $S_{11}$ and Step $S_{12}$ is repeated until it becomes the opposite scanning direction. When it becomes the opposite scanning direction, it goes to Step $S_1$ and a scanning detection is carried out again.

When the data character and the center bar data are normally read, it is judged whether the data character memorized in the RAM(C) is a right data or not in Step $S_{10}$. When it is judged as a right data, a right flag is set (Step $S_{13}$). And, the right data of the RAM(C) is transmitted to the RAM(B) (Step $S_{14}$). When it is judged as a left data, it is judged as "NO" in Step $S_{10}$ and then it goes to Step $S_{15}$ where it is judged whether it is a left data or not. When it is judged as a left data, a left flag is set (Step $S_{16}$). And, a left data of the RAM(C) is transmitted to the RAM(A) (Step $S_{16}$). When a left flag or a right flag is set, it is judged whether both the right and left flags are set or not (Step $S_{17}$). When both the right and left flags are set, it goes to Step $S_{18}$, a partial data of the RAM(A) and a partial data of the RAM(B) are composed, and a modular check is carried out (Step $S_{18}$). When the modular is normal, it is regarded that the data is regularly read and the measurement is finished. However, when the data is normally read by a first scanning, only one flag is set. Therefore, it is judged as "NO" in Step $S_{17}$ and it goes to Step $S_{20}$. When all data characters are normally read, the left data is memorized in the RAM(C) during the procedure in Steps $S_6$ through $S_9$. Therefore, the route of Steps $S_9$, $S_{10}$, $S_{15}$, $S_{16}$, $S_{17}$ and $S_{20}$ is pursued.

In Step $S_{20}$, the remaining right data in the RAM is transmitted to the ACC in succession. Then, it is judged whether the data is a data character or not in succession (Step $S_{21}$). When judged as "YES", the data character is converted to a numeric "N" and transmitted to the RAM(C) in succession (Step $S_{22}$). The loop of Steps $S_{20}$ through $S_{22}$ is repeated and the numeric "N" is transmitted to the RAM(C). When it is judged to be "NO" in Step $S_{21}$, it goes to Step $S_{23}$. It is judged it is an end bar or not in Step $S_{23}$. When it is judged as the end bar, it goes to Step $S_{24}$ and then it is judged whether the data in the RAM(C) is a right data or not. When it is judged as a right data, a right flag is set (Step $S_{25}$), and the data in RAM(C) is transmitted to the RAM(B) (Step $S_{26}$). In the case of "NO", it is judged whether it is a left data or not (Step $S_{27}$). In the case of "YES", a left flag is set (Step $S_{28}$), and the data in RAM(C) is transmitted to RAM(A) (Step $S_{29}$). And then it goes to Step $S_{30}$ where it is checked whether both right and left flags are set or not. Thereafter, in the case of "YES", the measurement is finished via Steps $S_{18}$ and $S_{19}$. However, when the data is normally read by the first scanning, the right data character is momorized in the RAM(C). Therefore, the measurement is finished via the loop of Steps $S_2$ through $S_{22}$ and the loop of Steps $S_{23}$, $S_{24}$, $S_{26}$, $S_{30}$, $S_{18}$, and $S_{19}$.

(2) In the case the bar code symbol 8 is dirty or defective as shown in FIG. 12:

At a first scanning $l_{1'}$, there is an unreadable place A in a left data character portion. Therefore, after the procedure of Steps $S_1$ through $S_9$, when data corresponding to the unreadable place A is called from the RAM memory in the loop of Steps $S_6$ through $S_9$, it is judged as "NO" in Step $S_7$ and then it goes to Step $S_9$. Since the data corresponding to the unreadable place A is not a center bar data either, it is judged as "NO" in Step $S_9$ and then it goes to Steps $S_{11}$ and $S_{12}$, wherein an opposite directional scanning $l_1''$ is detected and the procedure of Steps $S_1$ through $S_9$ is performed. If the scanning is performed here by holding the scanner portion 1 by hand, the scanning place is naturally displaced in the vertical direction due to shaking of the hand. At any rate, it is presume that there is no unreadable place in the right data character portion at the scanning $l_1''$.

In that case, the right data character is memorized in the RAM(C) as a partial data in the loop of Steps $S_6$ through $S_9$. In this example, since the center bar data is also normally detected, it is judged as "YES" in Step $S_9$ and then it goes to Step $S_{10}$. Since the right data character is memorized in the RAM(C), it is judged as "YES" in Step $S_{10}$ and a right flag is set (Step $S_{13}$), and the right data character of the RAM(A) is transmitted to the RAM(B), the right data character is memorized as a partial data in the RAM(B) (Step $S_{14}$), and then it goes to Step $S_{17}$.

In Step $S_{17}$, since only the right flag is set, it is judged as "NO" and then it goes to Step $S_{20}$. Succeedingly, the left data character momorized in the RAM memory is taken in the ACC successively. However, since there is the unreadable place A in the left data character, it is judged as "NO" in Step $S_{21}$, and then it goes to Step $S_{23}$. Since the data corresponding to the unreadable place A judged in Step $S_{21}$ is not an end bar either, it is judged as "NO" in Step $S_{23}$ and then it goes to Step $S_{12}$.

When the scanning $l_3'$ is performed by shaking hand, since an unreadable place A' is present in the left data character, it pursues the route of Steps $S_1$ through $S_9$, Step $S_{11}$ and $S_{12}$ again as in the same procedure as the scanning $l_3''$. And, presuming that a scanning "3" is performed, since the right data character is already detected, it is judged as "NO" in Step $S_5$ and then it goes to Steps $S_{11}$ and $S_{12}$. No procedure after Steps $S_{13}$ through $S_{30}$ is carried out.

In this way, when the scanning $l_2'$ is carried out, the left data character and the center bar data are normally read, although there is an unreadable place A in the right data character. Therefore, the left data character is memorized in the RAM(C) in the loop of Steps $S_6$ through $S_9$, and it is judged as "YES" in Step $S_9$, "NO" in Step $S_{10}$ and "YES" in Step $S_{15}$, and a left flag is set (Step $S_{19}$), and the setting of both the right and left flags is judged in Step $S_{17}$. When both the right and left flags are set by the scannings $l_1'$ and $l_2'$, it is judged as "YES" in Step $S_{17}$ and it goes to Step $S_{19}$, the partial data are composed, and after a modular check is performed (Step $S_{19}$), the measurement is finished.

(3) In the case the bar code symbol 8 is dirty as shown in FIG. 13:

At the scanning $l_1'$, the loop of Steps $S_1$ through $S_5$ and Steps $S_5$ through $S_9$, the loop of Steps $S_9$, $S_{10}$, $S_{15}$ and $S_{17}$, the loop of Steps $S_{20}$ through $S_{22}$, and the route of Steps $S_{23}$, $S_{11}$ and $S_{12}$ are pursued, the left data character is memorized in the RAM(A), and the opposite direction scanning $l_1''$ is started.

At the scanning $l_1''$, the loop of Steps $S_1$ through $S_5$, the loop of Steps $S_6$ through $S_8$, and the route of Steps $S_9$, $S_{11}$ and $S_{12}$ are pursued. The reason is that the right data character is unreadable. And, the scanning place is changed by shaking of the hand. Presume that the scanning $l_2'$ is carried out. At that time, the same route as the scanning $l_1''$ is pursued, too. And, presume that the opposite direction scanning $l_2''$ is started. At that time, the loop of Steps $S_1$ through $S_5$ and Steps $S_5$ through $S_8$, and the routes of Steps $S_9$, $S_{10}$, $S_{13}$, $S_{14}$, $S_{17}$, $S_{18}$ and $S_{19}$ are pursued, the right data is memorized in the RAM(B), the partial data are composed, and the measurement is finished.

Figure 5:
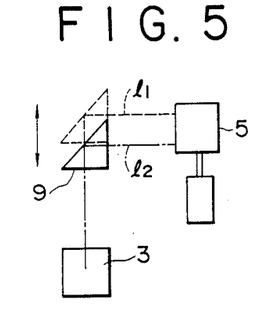
FIG. 5 is a schematic view for explaining one state in which a scanning place is automatically changed by means of driving a right angle prism.
Figure 6:
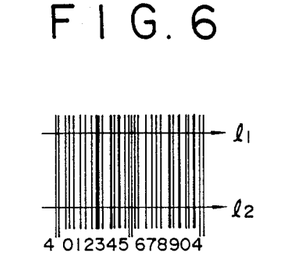
FIG. 6 is a schematic view for explaining one state in which the scanning place is automatically changed.

FIGS. 5 and 6 are illustrations showing one embodiment of a code reader according to a second invention of the present application, wherein a rectangular prism 9 can be driven in the vertical direction so that a scanning place is changed in the vertical direction of the bar code symbol 8. In the code reader of this embodiment, the scanning place is automatically changed without holding the scanner portion 1 by hand. The flow is the same as that of FIG. 4 except that the rectangular prism 9 is driven by a scanner control signal of the CPU.

Figure 7:
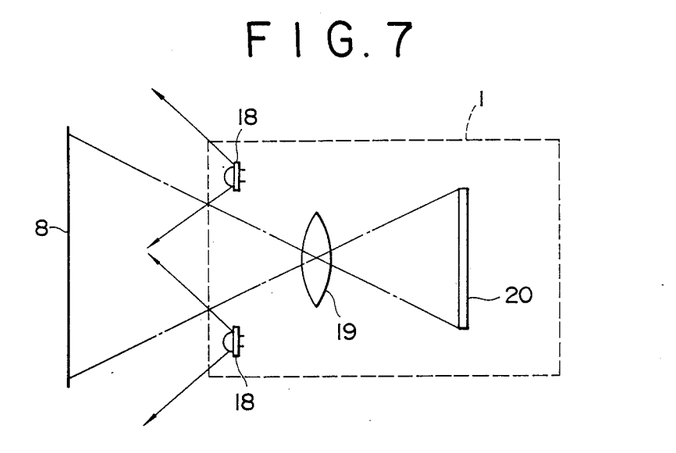
FIG. 7 is a plan view of an optical system of a scanner portion thereof.
Figure 8:
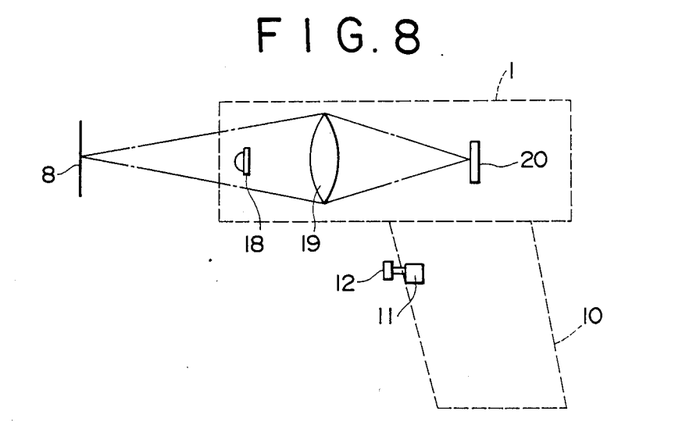
FIG. 8 is a side view of the optical system of FIG. 7.
Figure 9:
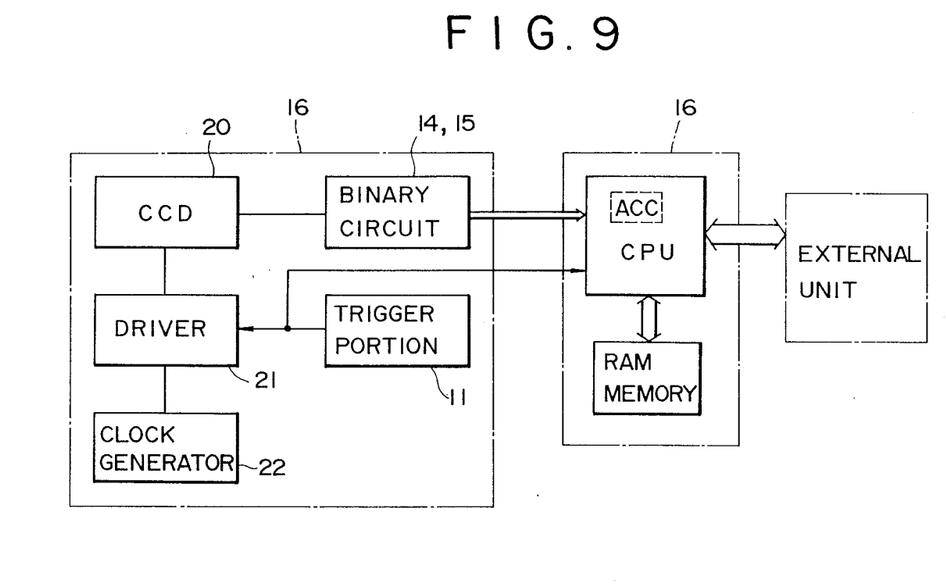
FIG. 9 is a circuit diagram thereof.

FIGS. 7 through 9 illustrate another embodiment of an optical type code reader according to the first embodiment which comprises an illumination light source 18 for illuminating the optical system of the scanner portion 1, an imaging lens 19, and a CCD 20. The scanner portion 1 is provided with a driver 21 for driving the CCD 20, and a clock generator 22 for feeding a clock signal to the driver 21 so that the data meant by the bar code symbol 8 is read by the CCD 20.

(1) In the case the bar code symbol is not dirty:

Since all data are read at a scanning place corresponding to the first scanning $l_1''$, the left data character is memorized as a partial data in the RAM(A) by the loop of Steps $S_1$ through $S_5$ and Steps $S_6$ through $S_8$ in the same procedure as the flow shown in FIG. 4. the right data character is memorized as a partial data in the RAM(B) by the loop of Steps $S_9$, $S_{10}$, $S_{16}$ and $S_{17}$ and Steps $S_{20}$ through $S_{22}$, the routes of Steps $S_{23}$, $S_{24}$, $S_{25}$, $S_{29}$ and $S_{30}$ and Steps $S_{18}$ and $S_{19}$ are pursued, and the measurement is finished.

(2) In the case the bar code symbol is dirty or defective as shown in FIG. 12:

At a scanning place corresponding to the first scanning $l_1'$, an unreadable place A is present at the left data character portion. Therefore, after the procedure of Steps $S_1$ through $S_5$, when data corresponding to the unreadable place A is called from the RAM memory in the loop of steps $S_6$ through $S_8$, it is judged as "NO" in Step $S_7$ and it goes to Step $S_9$. Since the data corresponding to the unreadable place is not a center bar data either, it is judged as "NO" in Step $S_9$ and it goes to Step $S_{11}$. It is judged whether the data is final or not in Step $S_{11}$. Since the data corresponding to the unreadable place is not the final data either, it is judged as "NO" in Step $S_{11}$ and it goes to Step $S_{12}$.

Figures 10, 10B:
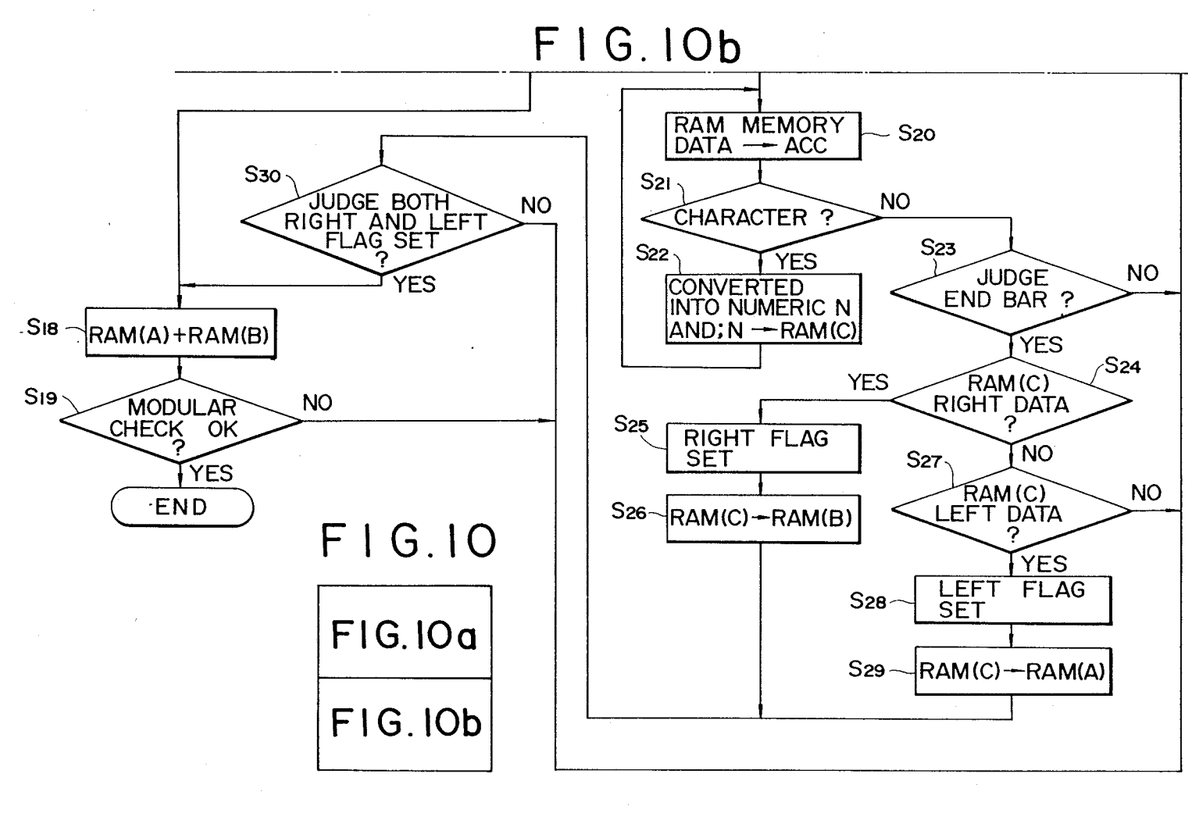
FIG. 10 is a flow chart for explaining the operation thereof.
Figure 10A:
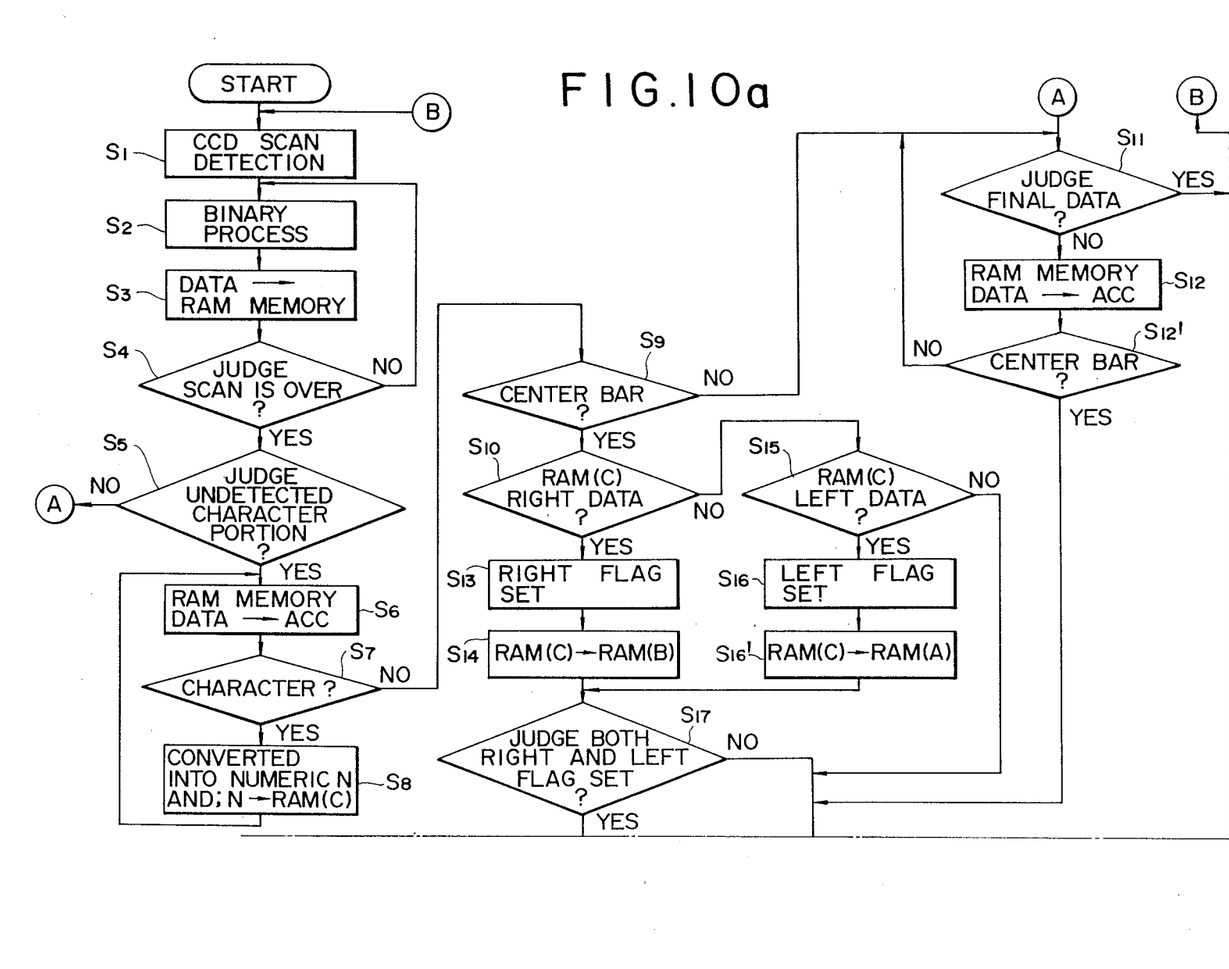

In Step $S_{12}$, the successive transmission of data from the RAM memory to the ACC is continued. That is, the data transmission is continued jumping over the unreadable place A. And, it is judged whether the transmitted data is a center bar or not (Step $S_{12}'$). When it is not the center bar either, the loop of Steps $S_{11}$ through $S_{12}'$ is repeated until the final data is transmitted. When the end bar data is normally read, the final bar is in accord with the end bar. However, when it is unreadable, the final data is not in accord with the end bar. At any rate, when the center bar is not detected in Step $S_{12}'$, it is judged as "YES" in Step $S_{11}$ and it goes to Step $S_1$. However, since the center bar is not dirty at the scanning place corresponding to the first scanning $l_1'$, the center bar is normally detected and it goes to Step $S_{20}$. In Step $S_{20}$, data of the RAM memory after the center bar is continuously and successively transmitted to the ACC again. Since the right data character is normal, the right data character is successively converted to a numeric value and memorized in the RAM(C) as a partial data in Step $S_{22}$. When the transmission is finished, it goes to Step $S_{23}$. In Step $S_{23}$, since the end bar data is normal, too, it is judged as "YES" and it goes to Step $S_{24}$. In Step $S_{24}$, it is judged whether it is the right data or not, and when it is judged as "YES", a right flag is set (Step $S_{25}$), data is transmitted from the RAM(C) and the right data character is memorized in the RAM(B) as a partial data (Step $S_{29}$), and it goes to Step $S_{30}$. Since only the right flag is set in Step $S_{30}$, it is judged as "NO" and it goes to Step $S_1$.

Although an unreadable place A is present in the right data character at a scanning place corresponding to the scanning $l_2'$, the left data character is normally read. Therefore, in Steps $S_6$ through $S_8$, the left data character is memorized in RAM(C), it is judged as "YES" in Step $S_9$, "NO" in Step $S_{10}$, and "YES" in Step $S_{15}$, and a left flag is set (Step $S_{19}$), and it is judged as "YES" in Step $S_{17}$ and it goes to Step $S_{18}$ wherein data is composed and after a modular check is performed (Step $S_1$), the measurement is finished.

(3) In the case the bar code symbol is dirty or defective as shown in FIG. 13:

At a scanning place corresponding to the scanning $l_1'$, the loop of Steps $S_1$ through $S_5$ and Steps $S_5$ through $S_9$, the loop of Steps $S_9$, $S_{10}$, $S_{15}$, $S_{16}$ and $S_{17}$ and Steps $S_{20}$ through $S_{22}$, and the route of Step $S_{23}$ is pursued, the left data character is memorized in the RAM(A), and it goes to Step $S_1$. And, when a scanning place corresponding to the scanning $l_2'$ is selected, in this case, the loop of Steps $S_1$ through $S_5$ and Steps $S_5$ through $S_9$, and the route of Steps $S_9$, $S_{10}$, $S_{13}$, $S_{14}$, $S_{17}$, $S_{18}$ and $S_{19}$ are pursued, and the measurement is finished.

Although several embodiments of the present invention have been described in the foregoing, the third invention of the present application is constituted as such that an image pick-up tube is used for a read portion for reading data from a code and a light pen is used for a read portion for reading data from a code.

As apparent from the foregoing description, even in the case only a part of the code is correctly read, all data can be correctly read by means of composition.

Therefore, even if the radiation of a bar code from one end bar to the other end bar is failed because of the short length of the bar code, etc., the radiation from one end bar to a center bar enables to read a half thereof, and another radiation from the center bar to the other end bar by means of displacing the radiating position, enables to read this bar code.

What is claimed is:

1. A bar code reader for reading a bar code disposed on a surface of an object, comprising:
   scanner means, including a galvano mirror, for scanning the bar code in a first direction and in a second direction opposite to said first direction, said scanner means including an illuminating light source for illuminating a bar code pattern via said galvano mirror, said bar code pattern having at least first and second partial code patterns divided by a center bar for optically distinguishing said first and second partial code patterns from each other;
   light receiving means for receiving light reflected by said at least first and second bar code patterns, and for generating respective output signals in accordance with said reflected light;
   binary processing means for binating said output signals generated by said light receiving means;
   decoding means operably connected to said scanner means for decoding the binary signals corresponding to each of said at least first and second partial code patterns according to an output power of said binary processing means;
   said decoding means including means for judging whether the partial code pattern data corresponding to respective ones of said at least first and second partial code patterns is correctly read;
   memory means, responsive to said judging means, for storing the partial code pattern data correctly read; and
   code data composing means for composing said at least first and second partial code pattern data stored in said memory means, said bar code pattern being illuminated with said illuminating light source by moving one of said scanner means and said bar code pattern thereacross.

2. A bar code reader according to claim 1, wherein said at least first and second partial code patterns each comprise at least one data character.

3. A bar code reader according to claim 1, wherein said scanning means includes means for memorizing said first partial code pattern when said illuminating light source is moved across said bar code pattern in said first direction, and for memorizing said second partial code pattern when saidlight source is moved across said bar code pattern in the second direction.

4. A bar code reader for reading a bar code disposed on a surface of an object, comprising:
   scanner means, including an illuminating light source, for illuminating a bar code pattern, said bar code pattern being divided into at least first and second partial code patterns by a center bar for optically distinguishing said first and second partial code patterns from each other;
   scanning optical means for guiding an illumination light emitted by said illuminating light source to the bar code pattern, and for scanning the bar code in a first direction and in a second direction opposite to said first direction;
   light receiving means for receiving light reflected by said bar code pattern and for generating signals in accordance with light reflected by said at least first and second partial code patterns;
   binary processing means for binating said output signals of said light receiving means;
   decoding means operably connected to said scanning means for decoding the binary signal corresponding to each of said at least first and second partial code patterns according to an output power of said binary processing means;
   said decoding means including means for judging whether the partial code pattern data corresponding to respective ones of said at least first and second partial code patterns is correctly read;
   memory means, responsive to said judging means, for storing said partial code pattern data correctly read; and
   code data composing means for composing the partial code pattern data stored in said memory means.

5. A bar code reader according to claim 4, wherein said at least first and second partial code patterns each comprise at least one data character.

6. A bar code reader according to claim 4, wherein said scanning means includes means for memorizing said first partial code pattern when said illuminating light is moved across said bar code in, said first direction, and for memorizing said second partial code pattern when said illuminating light is moved across said bar code pattern in the second direction.

7. A bar code reader comprising:
   means for reading data from a bar code pattern by scanning the bar code pattern in a first direction and in a second direction opposite said first direction, said bar code pattern being divided into at least first and second partial code patterns by a center bar for optically distinguishing said first and second partial code patterns from each other, and for outputting signals in accordance with the data read from each of said at least first and second partial code patterns;
   decoding means for decoding said signals from said reading means;
   means for judging whether the partial code pattern data corresponding to said at least first and second partial code patterns is correctly read;
   memory means, responsive to said judging means, for storing said first and second partial code pattern data correctly read; and
   code data composing means for composing said code data stored in said memory means.

8. A code reader according to claim 7, wherein said reading means includes an image pick-up tube.

9. A code reader according to claim 7, wherein said reading means includes a light pen.

* * * * *